United States Patent
Wutte et al.

(10) Patent No.: US 12,499,273 B2
(45) Date of Patent: Dec. 16, 2025

(54) METHODS FOR TRANSMISSION OF MEDICAL DATASETS

(71) Applicant: Siemens Healthineers AG, Forchheim (DE)

(72) Inventors: Milan Wutte, St. Kanzian am Klopeiner See (AT); Thomas Gossler, Erlangen (DE); Christian Spitzner, Forchheim (DE); Ute Rosenbaum, Kempten (DE); Felix Kupsch, Spardorf (DE); Markus Metz, Aurachtal (DE); Anthony Jay, Erlangen (DE); Marco Krenkel, Hallerndorf ot Schlammersdorf (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 181 days.

(21) Appl. No.: 18/467,118

(22) Filed: Sep. 14, 2023

(65) Prior Publication Data

US 2024/0095401 A1    Mar. 21, 2024

(30) Foreign Application Priority Data

Sep. 15, 2022    (EP) ..................... 22195798

(51) Int. Cl.
 *G06F 21/62*    (2013.01)
 *G16H 10/60*    (2018.01)
 *H04L 9/40*    (2022.01)

(52) U.S. Cl.
 CPC ......... *G06F 21/6254* (2013.01); *G16H 10/60* (2018.01); *H04L 63/20* (2013.01)

(58) Field of Classification Search
 CPC ...... G06F 21/6254; G16H 10/60; H04L 63/20
 See application file for complete search history.

(56) References Cited

U.S. PATENT DOCUMENTS

| 6,463,417 B1 * | 10/2002 | Schoenberg ........... G06Q 10/10 705/2 |
| 2007/0061393 A1 * | 3/2007 | Moore .................... H04L 67/02 709/201 |

(Continued)

FOREIGN PATENT DOCUMENTS

| EP | 3023896 A1 | 5/2016 | |
| EP | 3023902 A1 * | 5/2016 | ........... G06F 19/322 |
| JP | 2020102214 A * | 7/2020 | ............. G16H 10/60 |

OTHER PUBLICATIONS

"K-anonymity—Wikipedia"; Aug. 27, 2022 (Aug. 27, 2022), XP093020833, Gefunden im Internet: URL:https://web.archive.org/web/20220827120119/https://en.wikipedia.org/wiki/K-anonymity#Hash-based_k-Anonymity.

*Primary Examiner* — Hee Soo Kim
(74) *Attorney, Agent, or Firm* — Harness, Dickey & Pierce, P.L.C.

(57) ABSTRACT

One or more example embodiments of the present invention relates to a method for transmission of medical datasets, including providing a medical dataset from an internal data memory, the medical dataset including data elements, each data element of the data elements having a data type, providing a security profile, the security profile including rules for a degree of a data anonymization of data elements of a respective data type, creating an anonymized medical dataset based on the provided medical dataset and the provided security profile, the data elements of the medical dataset are each anonymized based on the respective data type and the security profile, the anonymized medical dataset includes the anonymized data elements and transmitting the anonymized medical dataset to an external data memory.

17 Claims, 3 Drawing Sheets

(56) References Cited

U.S. PATENT DOCUMENTS

| | | | |
|---|---|---|---|
| 2007/0106754 A1* | 5/2007 | Moore | G16H 40/20 |
| | | | 707/E17.116 |
| 2014/0047551 A1* | 2/2014 | Nagasundaram | G06F 16/285 |
| | | | 726/26 |
| 2016/0148017 A1* | 5/2016 | Goßler | G06F 16/86 |
| | | | 726/27 |
| 2016/0154977 A1* | 6/2016 | Jagadish | G06F 21/6254 |
| | | | 726/26 |
| 2017/0091391 A1* | 3/2017 | LePendu | G06F 21/6245 |
| 2018/0082020 A1* | 3/2018 | Rajagopal | G06F 21/6254 |
| 2021/0240853 A1* | 8/2021 | Carlson | G16H 10/20 |
| 2025/0242017 A1* | 7/2025 | Xiao | G01N 33/57488 |

* cited by examiner

FIG 3A
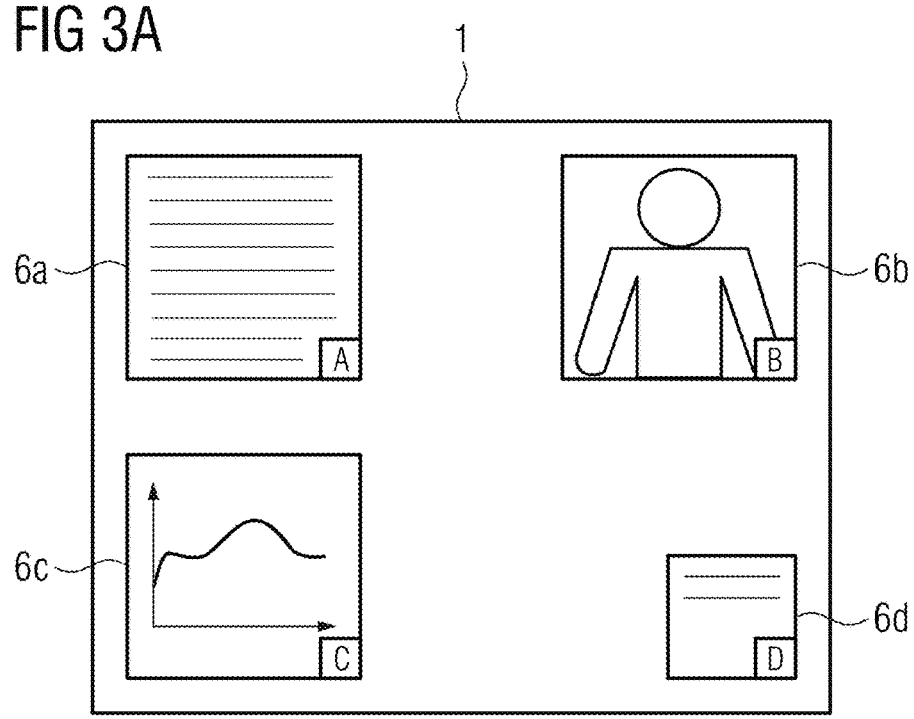
FIG 3B
FIG 3C
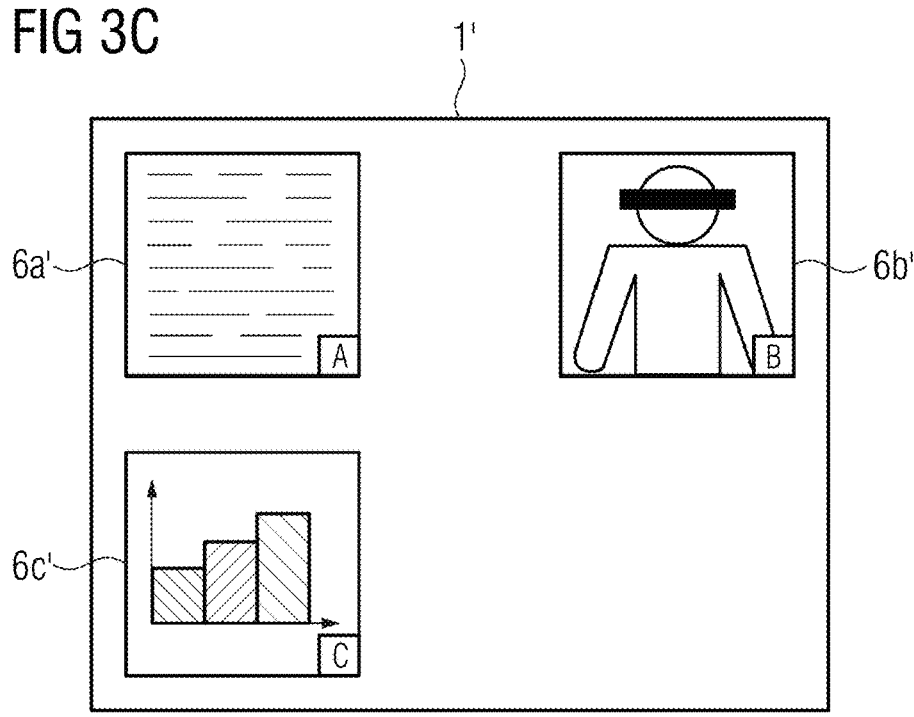

METHODS FOR TRANSMISSION OF MEDICAL DATASETS

CROSS-REFERENCE TO RELATED APPLICATION(S)

The present application claims priority under 35 U.S.C. § 119 to European Patent Application No. 22195798.8, filed Sep. 15, 2022, the entire contents of which are incorporated herein by reference.

FIELD

One or more example embodiments of the present invention relates to methods for transmission of medical datasets from an internal data memory to an external data memory.

RELATED ART

Medical facilities, such as hospitals for example, are increasingly using Cloud-based software solutions. These software solutions require sensitive medical patient data to be uploaded into a data center. The uploading is carried out via specific upload software. The upload software frequently uploads the patient data to the data center without anonymization. Therefore the hospital must carry out an anonymization before the actual uploading in order to comply with the respective data protection requirements. This process is susceptible to errors, is time-consuming and is difficult to control. In particular different country-specific data protection requirements apply in different countries. Moreover it cannot be ensured that the uploaded patient data can be processed in the Cloud.

Large platform providers take the approach of transmitting all data automatically from the internal memory to the external memory, even without it being needed for a specific medical method in the Cloud.

SUMMARY

While methods for anonymization of individual data are increasingly being adopted in the handling of medical data, the secure anonymization or minimization of datasets that comprise a plurality of (different) individual data (data elements) (for example FHIR), in medical data processing is unresolved.

One or more example embodiments of the present invention automatically provides medical datasets with a number of data elements with few technical resources in such a way that data protection is guaranteed and yet still all relevant data can be provided to the external data memory.

This object is achieved by subject matter as claimed in the independent claim. Advantageous forms of embodiment are the subject matter of the dependent claims, the description and the drawings.

BRIEF DESCRIPTION OF THE DRAWINGS advantages, effects and embodiments emerge from the enclosed figures and their description. In the figures.

Figure 4:
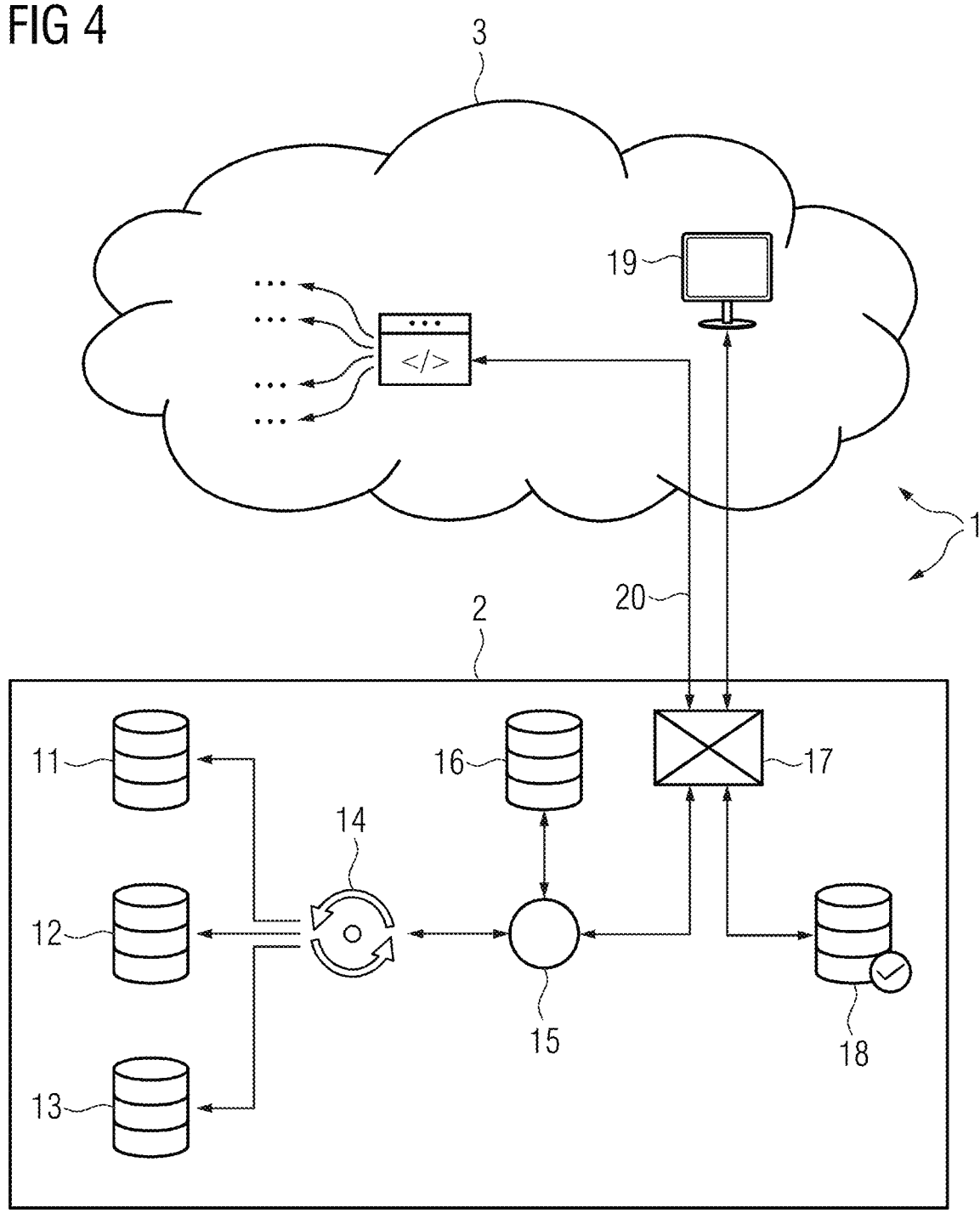

FIGS. 3*a*, 3*b*, 3*c* show a schematic structure of a medical dataset, of a security profile and of an anonymized medical dataset according to one or more example embodiments; and FIG. 4 shows a schema of an apparatus for transmission of a medical dataset according to one or more example embodiments.

DETAILED DESCRIPTION

In accordance with one or more example embodiments, a method for transmission of medical datasets includes:

provision of a medical dataset from an internal data memory, wherein the medical dataset comprises data elements, wherein the data elements each have a data type, provision of a security profile, wherein the security profile comprises rules about the degree of a data anonymization of data elements of a respective data type, creation of an anonymized medical dataset on the basis of the medical dataset provided and the security profile, wherein the data elements of the medical dataset are each anonymized based on the respective data type and the security profile, wherein the anonymized medical dataset comprises the anonymized data elements, transmission of the anonymized medical dataset to an external data memory.

The method is in particular for transfer of medical datasets, for example in the form of a medical data packet, from a local data memory, for example a hospital, a practice or a medical center, to an external data memory, in particular a Cloud memory or a Cloud for Cloud computing, for example for handling, processing and/or sharing of medical data and/or of data elements contained therein.

The medical datasets are provided from the local data memory, also called internal data memory. Provision can be understood for example as provision of stored medical datasets as the dataset, as access rights to the medical dataset. Specifically the provision of the medical dataset is initiated and triggered by a request for a medical dataset, wherein the requested medical dataset is provided and/or released for further use, anonymization and/or transfer. The medical dataset is in particular embodied as a data packet. The medical dataset comprises data elements, also called individual data. In particular the medical dataset comprises a plurality of data elements. The data elements each have a data type. The data elements comprised by a medical dataset can comprise the same, different and/or a mixture of data types. Examples of data elements of the medical dataset are image data, laboratory data or patient data. Especially preferably the medical datasets comprise FHIR data and/or have the FHIR data format. Medical datasets, in particular FHIR data, preferably form compact and/or in self-contained data packets. Specifically the medical datasets exhibit a uniform and/or well-defined behavior and/or comprise and/or are based on semantics, a context and/or Metadata.

Specifically the medical datasets comprise resources, references and/or profiles. The resources, references and/or profiles are preferably embodied according to the FHIR standard. Resources are understood in particular as compact, logically discrete units of a data exchange, in particular with well-defined behavior and/or unique semantics. Specifically resources form the smallest unit of a transmission and/or transfer. Especially preferably the medical datasets, in particular in FHIR format, comprise at least 100, specifically at least 150, specified resources and/or less than 200, specifically less than 300 resources.

A resource preferably consists of three parts:
- structured data—these attributes cover 80% of the usual usage scenarios. Attributes have only been accepted during the specification into this part of the resource when it could be assumed that at least 80% of all implementations that use this resource also need it. Contents extending beyond this must be mapped via extensions.
- narrative—textual, human-readable summary of the contents of the resource.
- extensions—Expansions to support usage scenarios outside the usual use cases.

The provision of the security profile can be understood as a stored definition and provision of the security profile. Specifically the security profile provided can be defined and/or adapted by a user or administration. It is especially preferred that the provision of the security profile is embodied as a choice of a security profile from a plurality of selectable security profiles. As an alternative and/or in addition, the provision of the security profile can be embodied as an adaptation, parameterization and/or definition of an adaptable and/or selectable security profile. Specifically a lowest anonymization security profile can be provided as the security profile, also called a minimum security profile, a medium security profile and/or a high security profile can be provided. The security profile describes and/or defines rules about the degree of a data anonymization and/or the degree of a data anonymization for data elements of the different data types. For example the security profile describes and/or defines the degree to which the various data types or the data elements of the medical dataset are to be anonymized. Data anonymization is also understood in particular as a data minimization, for example in relation to the information content. The data minimization is embodied in particular, to alienate, to remove and/or to anonymize information and/or data, in particular that which is subject to data protection. For example in this way identifications such as name, address or reference number can be removed, redacted or alienated. Data anonymization can further also be understood as an abstraction of an item of information, for example the clustering of an age into intervals. In particular the security profile provides a different anonymization for different data types. It is further especially preferred that the different security profiles provide different degrees of data anonymization, so that for example the minimum security profile anonymizes or alienates less information and/or data than the high security profile.

The creation of the anonymized medical dataset is based in particular on the use and/or carrying out of the data anonymization regulated by the security profile on the medical dataset, in particular on the data elements of the medical dataset. In other words the data elements of the medical dataset are anonymized corresponding to the data type that they each have, wherein the anonymized data elements are comprised by the anonymized medical dataset. The anonymized medical dataset in other words comprise the anonymized data elements of the underlying medical dataset, wherein, corresponding to their data type, these can be anonymized, abstracted or minimized to different degrees.

The created anonymized medical dataset is provided, transmitted and/or sent from the local data memory to the external data memory. Specifically there is provision for the anonymized medical dataset to be encrypted, compressed and/or further processed before its transmission, transfer and/or sending. The transmission is preferably undertaken via a secure data connection between external and internal data memory. Specifically the data connection between external and internal data memory is supervised in respect of the data transmission by the external or internal data memory. For example the internal or external data memory monitor whether only anonymized medical datasets and in particular no other types, in particular unanonymized medical datasets are being transmitted over the data connection.

The inventors have recognized that, to guarantee data protection, the data to be transmitted, in particular medical datasets, is already anonymized and/or minimized on the internal data memory side, so that information and/or data to be protected is not provided to the external data memory first. The inventors have further recognized that the medical dataset as a whole or the data elements contained within it are not to be anonymized in a uniform manner, but that it is more efficient and more advantageous for further data processing to anonymize the data elements comprised by the medical dataset in different ways or to different degrees, so that all necessary data elements or information are provided to the external data memory and at the same time the items of information or data types that are not needed or are sensitive are anonymized. In particular in this way an optimum data transmission of anonymized medical data packets containing reduced amounts of data can be undertaken. In this way the security profiles can depend on the planned processing of the medical data in the Cloud or the external data memory, so that for example all items of information that are not needed for carrying out the planned further processing are removed, abstracted or anonymized.

In particular there is provision for data elements with a data type that is not regulated by the security profiles and/or the selected or provided security profile not to be comprised by the anonymized medical dataset and/or assigned to said dataset. This is based in particular on the idea that non-regulated anonymization of data types can lead to an unwanted transmission of items of information that are sensitive and/or are to be protected, in particular that even if a strict anonymization and/or regulation is applied, it might not be able to be ensured that previously unrecognized items of sensitive information and/or statistical relationships, which can be used for a re-identification, are anonymized. Therefore the embodiment provides for such data elements with unregulated anonymization to be excluded from the anonymized medical dataset. In other words the anonymized medical dataset only comprises anonymized data elements and/or the anonymized medical dataset is free from anonymized data elements. Alternatively, but less preferably, data elements with a data type for which the security profiles and/or the security profile do not comprise any regulation are anonymized with a predetermined and/or predeterminable anonymization and assigned to the anonymized medical dataset with highest anonymization. This embodiment takes into consideration that possibly unknown data or identifiers to be protected will still be transmitted, through which the further processing of the anonymized data is to be made possible.

One embodiment of the invention makes provision for there to be a request to transmit a medical dataset. The request is made for example from the external data memory to the internal data memory. The request comprises for example the invitation to the internal data memory to provide a requested medical dataset. The request can be a request for an actual medical dataset, for example designation or number the dataset. The request can further relate to direct Identifiers, for example to the name of the patient or diagnosis belonging to the medical dataset. As an alternative the request can represent an anonymized request, for example a request for a dataset with predetermined characteristics, for example gender, age or examination modality. Specifically the request is based on a Cloud application carrying it out, for example diagnosis setting with an evaluation tool, wherein the selected tool or the application requests the data needed for its execution.

On the internal data memory side, based on the request, a medical dataset belonging to or matching the request is selected and/or sought. For example a match between the requested characteristics, identifiers or reference number is checked. In particular the selection can comprise a selection of a majority of medical datasets, if for example a number of medical datasets are suitable for request. The medical dataset selected in this way is provided in the step provision of the medical dataset and in particular included for creation of the anonymized medical dataset. This embodiment is based on the idea that only such medical datasets as are actually needed are transmitted as anonymized medical datasets, wherein whether a dataset is needed is regulated based on the request.

Especially preferably there is provision, on the internal data memory side, for the transmission of data between internal and external data memories to be monitored, for example by monitoring the data connection. The monitoring comprises in particular a suppression, prevention and/or filtering out of medical datasets not to be anonymized or of non-requested medical datasets. For example on the internal data memory side only the transmission of requested and/or of anonymized medical datasets that are monitored, released and/or allowed is brought about. There can for example further be provision for the monitoring to comprise an output of an error message and/or of an alarm when it is established that a non-requested, non-anonymized medical dataset is being transmitted and/or is about to be transmitted.

It is especially preferred for the security profile provided to comprise and/or form a standard security profile. The standard security profile is for example a security profile that comprises or forms a minimum anonymization or minimal anonymization of the data elements. For example the standard security profile regulates that direct identifiers are to be removed, to be anonymized or to be abstracted from the associated data elements, specifically in which form the abstraction is to take place. Direct identifiers are for example actual names of patients, addresses and/or unique labels.

There can furthermore be provision for the security profile provided to form and/or comprise a medium security profile and/or for a security profile to form and/or comprise a high security profile. In particular the anonymization or the degree of the anonymization of the medium security profile is higher than that of the standard security profile, but lower than that of the high security profile. The medium security profile comprises and/or regulates the anonymization of the associated data elements for example wherein, as well as the direct identifiers, indirect identifiers are also anonymized or abstracted. Indirect identifiers are for example age, gender and/or diagnosis. The high security profile comprises and/or regulates for example the anonymization of the associated data elements in the form in which such information is abstracted or removed as it would make a statistical re-identification possible. For example there can be an anonymization based on k clustering for this purpose.

It is especially preferred that the medical datasets provided form an FHIR file or FHIR dataset, in particular that the medical datasets have an FHIR format. FHIR (Fast Healthcare Interoperability Resources, spoken as "fire") is in particular understood as a standard that was first introduced by Health Level Seven International (HL7). The standard supports the exchange of data between software systems in healthcare. It combines the advantages of the established HL7 standard product lines Version 2, Version 3 and CDA with those current Web standards and puts a strong focus on ease of implementation.

One embodiment of the invention makes provision for reference data to be provided by the internal data memory and/or to be requested by the external data memory. Reference data describes a relationship between at least two medical datasets. For example an item of reference data can describe the relationship between a medical dataset of a patient and a medical dataset of an examination. Since the reference data does not comprise any information or any direct information about the associated individual, the anonymization of such reference data is not absolutely necessary or can be restricted to an anonymization in the case of the high security profile. Here there is provision for a reference security profile to be provided, for example in the form of storing or defining the reference security profile in the internal data memory. In particular there is provision for a reference security profile to form a high security profile. For the case that the reference security profile is selected and/or is applicable, transmission reference data is created. The transmission reference data comprises the anonymized reference data.

A computer program forms further subject matter of one or more example embodiments of the present invention, wherein the computer program is embodied for execution on a computer, in particular on the inventive apparatus for transmission of medical datasets. The computer program is embodied or configured, when executed, to carry out and/or apply the method for transmission of the medical datasets.

A machine-readable memory medium forms further subject matter, wherein the computer program is stored on the memory medium.

An apparatus for transmission of medical datasets forms further subject matter. The apparatus comprises an internal data memory and an external data memory. The internal data memory is embodied to provide a medical dataset. The internal data memory is further embodied to provide a security profile, for example in the form of a stored security profile. The internal data memory is embodied to create an anonymized medical dataset on the basis of the security profile provided and the medical dataset provided. Here, on the internal data memory side, the data elements of the medical dataset are anonymized each based on the associated data type and corresponding to the security profile. The anonymized data elements form the anonymized medical dataset. The internal data memory is embodied to transmit the anonymized medical dataset to an external data memory. In particular the external data memory can be embodied to direct a request for transmission of a medical dataset to the internal data memory, in response to which the internal a medical dataset belonging to the request is selected, provided and anonymized by the data memory.

Figure 1:
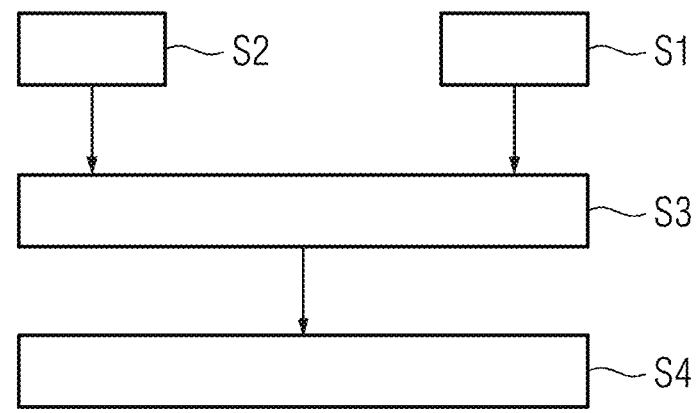
FIG. 1 shows a schematic execution sequence of a method for transmission of a medical dataset according to one or more example embodiments.

FIG. 1 shows a first exemplary embodiment of an execution sequence of a method for transmission of a medical dataset 1. The method is carried out and/or applied for example by an apparatus 2 for transmission of the medical dataset 1. The method is used for the transfer of the medical dataset 1 by an internal data memory 3, for example in the form of a medical practice or a hospital, to an external data memory 4, for example a Cloud. The external data memory 4 is embodied for Cloud computing, in particular for processing, analysis and/or evaluation of the medical dataset 1, specifically via applications or software provided and able to be executed in the Cloud.

The method makes provision for the medical dataset 1, which can comprise information relevant to data protection, for example patient data, to be anonymized on the internal data memory 3 side before its transmission to the external data memory 4. The anonymization in this case can be applied to different degrees, wherein the degree of the anonymization is defined based on a security profile 5.

In a method step S1 at least one medical dataset 1 is provided on the internal data memory 4 side. For example a medical dataset 1 intended by a user to be evaluated and/or processed in the Cloud is provided. To this end the medical dataset 1 can be retrieved for example from the local data memory 3. The medical dataset 1 in particular has a format based on the FHIR standard. The medical dataset 1 comprises a plurality of data elements 6. The data elements 6 can for example form individual files, for example image data, laboratory data, patient reports, examination protocols or results of studies. The data elements 6 each have a data type, for example this describes the contents of the data element (for example patient records) or format (for example MR image). The medical dataset 1 in particular forms a structured dataset.

In a method step S2 a security profile 7 is provided. The provision of the security profile 7 can for example be understood as the presence of a security profile 7 held and/or stored. In particular the security profile 7 is provided on the internal data memory 3 side, for example stored in said memory. The provision of the security profile 7 can further be embodied as the definition of an adaptable security profile 7, for example in the form of a template. As an alternative and/or in addition the provision of the security profile 7 can be embodied as a choice of a security profile 7 from a plurality of selectable security profiles 7. The choice and/or the definition of the security profile 7 is preferably undertaken by a user or administrator of the internal or external data memory 3, 4.

The selectable security profiles 7 and/or the definitions of security profiles differ in particular in the regulation with regard to the nature and/or the degree of the anonymization of data elements 6 in a medical dataset 1. The security profile 7 in such cases specifies how data elements 6 of the different data types are to be anonymized. For example a security profile 7 can regulate that data elements 6 of specific data types are to be anonymized more strongly than data elements 6 of another data type.

In a method step S3, on the basis of and/or from the provided medical dataset 1, an anonymized medical dataset 1' is created. To this end the data elements 6 of the medical dataset 1*i* provided in step S1 are anonymized based on the selected and/or defined security profile 7. In other words the data elements 6 of the medical dataset 1 are each anonymized in accordance with the respective data type, as is regulated for the respective data type in security profile 7. For example direct identifiers such as names or addresses are removed or alienated for anonymization. Further anonymization, in particular of more strict security profiles 7, comprises for example the removal or abstraction of indirect identifiers or a clustering of indirect identifiers into Intervals, for example of one age, or the anonymization of statistical identifiers, for example of patient distributions. The anonymized data elements 6' together form the anonymized medical dataset 1'. For example the anonymized data elements 6' are aggregated to a dataset, wherein this forms the anonymized medical dataset 1'.

In a method step S4 the created anonymized medical dataset 1' is transmitted from the internal data memory 3 to the external data memory 4. Preferably the dataset is transmitted encrypted, wherein the anonymized medical dataset 1' is encrypted and/or compressed before the transmission on the internal data memory side 3. The encryption can be based on a previous exchange of keys between internal and external data memory 3, 4. The external data memory 4 is thus provided with the anonymized medical dataset 1', and can use this for further evaluation, processing and/or analysis. The external data memory 4 is thus only provided with anonymized medical datasets 1' so that the external data memory 4 has no access at all to data elements 6 of relevance for data protection. Data elements 6 of relevance for data protection thus do not leave the internal data memory 6. Further not all data elements 6 of a medical dataset 1 are anonymized at the same time but are anonymized differently depending on data type. Through the definition, selection and/or provision of the security profile 7 a general degree of the anonymization of the medical datasets 1 or specific regulation of the anonymization of particular data types can be regulated or adapted by the user and/or administrator.

Figure 2:
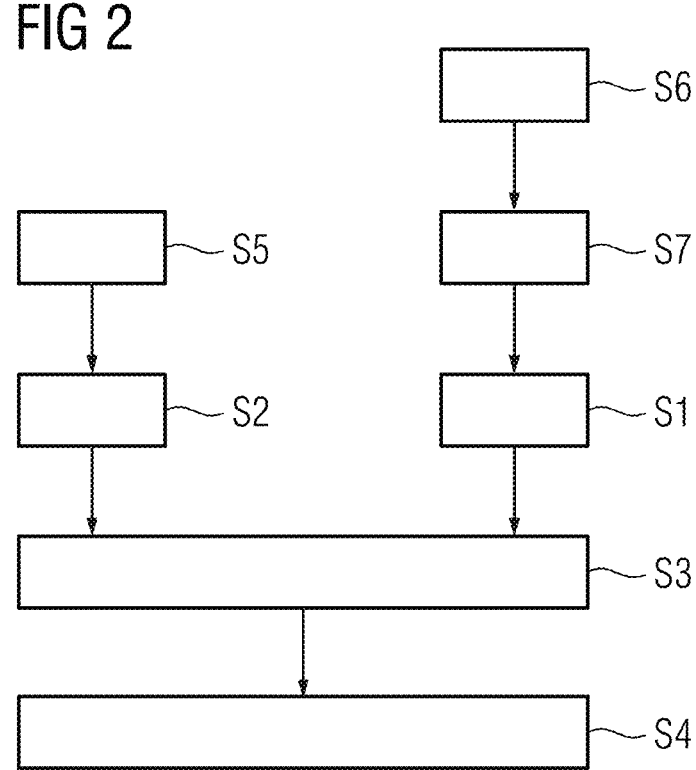
FIG. 2 shows a schematic execution sequence of a method for transmission of a medical dataset as a further exemplary embodiment.

FIG. 2 shows a second exemplary embodiment of a method for transmission of a medical dataset 1 from an internal data memory 3 to an external data memory 4. Essentially the method is embodied as outlined in the framework of FIG. 1. Unlike in the exemplary embodiment of FIG. 1, the method of the exemplary embodiment from FIG. 2 has the additional method steps S5, S6 and S7, which precede the method steps S1-S4.

In method step S5 a security profile 7 to be applied is selected, defined and/or adapted by a user. For example the user can select from a plurality of ready-made security profiles 7 and/or adapt one to their needs. The choice, the definition and/or adaptation of the security profile 7 can in particular be made via a user interface, in particular a Graphical User Interface, which is provided by the external data memory 3, the internal data memory 4 or as a Web application. The security profile 7 S5 is passed and/or provided to the method step S2 for provision. In other words the security profile 7 selected, defined and/or adapted in method step S5 is provided in method step S2 as the security profile 7.

In the method step S6 there is a request to the internal data memory 3. The request is undertaken for example by the external data memory 4 and the internal data memory 3. The request of the external data memory 4 can be undertaken for a request of a software application, of an evaluation, diagnosis or analysis application, which is to be executed or applied at the external data memory, for example the Cloud. For example the request relates to a medical dataset 1 needed or desired by the external data memory 4, for further processing and/or evaluation for example. The request can be a concrete request, via a direct identifier for example (for example medical dataset comprising MRT images of Ms. Müller, DoB. 1.1.2011). As an alternative the request can form an anonymized request, for example via an indirect Identifier (for example medical dataset comprising Cholesterol values of males aged between 20 and 30).

In method step S7 the internal data memory 3 selects at least one medical dataset 1 matching the request. To this end the internal data memory 3 searches in its stored medical datasets 1 for matching medical datasets 1. The selected medical dataset 1 is provided to step S1 and/or it forms the medical dataset 1 provided in step S1.

FIG. 3*a* shows schematically an example of a medical dataset 1. The medical dataset 1 forms a structured dataset. In particular the medical dataset 1 has an FHIR format. The medical dataset 1 comprises a plurality of data elements 6*a*, *b*, *c*, *d*, for example a patient file as data element 6*a*, a tomography recording of a patient as data element 6b, a temporal course of a patient parameter (for example blood pressure) as data element 6c and an MR sequence as data element 6d. Here the data element 6a has the data type A, the data element 6b the data type B, the data element 6c the data type C and the data element 6d the data type D.

FIG. 3b shows a schematic structure of a security profile 7. The security profile 7 describes and/or regulates the degree and/or type of anonymization of data elements 6 of a medical dataset 1. In this case the security profile specifies how strongly the data elements 6 of different data types are to be anonymized. For example the security profile 7 regulates that in data elements 6, 6a of the data type A direct identifiers are to be removed, that in data elements 6, 6b of the data type B characteristic image regions are to be blacked out and/or that in data elements 6, 6c of the data type C values and/or parameters are to be clustered.

FIG. 3c shows an exemplary embodiment of an anonymized medical dataset 1'. The anonymized medical dataset 1" shown is based on the medical dataset 1 from FIG. 3a, wherein the anonymized medical dataset 1' has been created based on the use of the security profile 7 from FIG. 3b.

The data element 6a from FIG. 3a has been anonymized by removal of the direct identifiers, wherein the anonymized data element 6a" has been created. The data element 6b from FIG. 3a has been anonymized by blacking out predetermined regions of the image, for example parts of the eyes, wherein the anonymized data element 6b" has been created. The data element 6c from FIG. 3a has been anonymized by clustering of the abscissa values, wherein the anonymized data element 6c" has been created. For the data element 6D with the data type D the security profile 7 did not comprise any rules so that no anonymized data element 6d" could be created. Since it is demanded by the anonymized medical dataset 1' that it is free from unanonymized data elements 6, the data element 6d is not included in the anonymized medical dataset 1'.

FIG. 4 shows an example of an apparatus 2, also called a system, for transmission of a medical dataset 1. The apparatus 1 comprises an internal data memory 3 and an external data memory 4. The internal data memory 3 forms a part of a hospital IT infrastructure for example. For example the local data memory 2 comprises a Picture Archiving and Communication System (PACS) 11, a Radiology Information System (RIS) 12 and/or a system for Electronic Medical Records (EMR) 13. The internal data memory 3 comprises a module 14 for a connection management and/or for data normalization. The internal data memory 3 further comprises a data memory 15 and a module 16 for data management, for Collaborative Product Data Management for example. FHIR data is in particular exchanged and/or stored within the internal data memory.

The internal data memory 3 comprises a connector module 17, which can be embodied for example from processor, computer and/or software module. The connector module 17 is in particular embodied to carry out and/or to apply the method step S3 and/or S4 of the inventive method. In particular the connector module 17 is embodied to receive a request from the external data memory 4. Specifically there is provision for the connector module 17 to have a data connection to an anonymization module 18, wherein the anonymization module 18 is embodied here to carry out the creation of the anonymized medical dataset 1' or the method step S3.

Via a self-service configurator 19, for example in the form of a Web interface and/or a Graphical User Interface, a security profile 7 is selected and/or defined by a user. The selected and/or defined security profile 7 is provided to the internal data memory 3, in particular to the connector module 17 for use.

The connector module 17 is embodied to transmit the anonymized medical dataset 1' to the external data memory 4 over a data connection 20. The external data memory 4 for its part is embodied for Cloud computing or for the use of software and/or an application in the Cloud. The user can further process and/or evaluate the transmitted anonymized medical dataset 1' in the external data memory. In particular the anonymized medical dataset can be stored in the external data memory.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

The invention claimed is:

1. A method for transmission of medical datasets, comprising:
providing a medical dataset from an internal data memory, the medical dataset including data elements, each data element of the data elements having a data type;
providing a security profile, the security profile including rules for a degree of a data anonymization of data elements of a respective data type;
creating an anonymized medical dataset based on the medical dataset and the security profile, the data elements of the medical dataset are each anonymized based on the respective data type and the security profile, the anonymized medical dataset includes the anonymized data elements;
providing reference data by the internal data memory, the reference data describing a relationship between at least two medical datasets;
providing a reference security profile from a plurality of reference security profiles;
creating transmission reference data based on the provided reference data and the provided reference security profile, the reference data is anonymized for the transmission reference data if a highest reference security profile is provided as the provided reference security profile and the reference data remains unanonymized in the transmission reference data if the provided reference security profile deviates from the highest reference security profile; and transmitting the anonymized medical dataset and the transmission reference data to an external data memory.

2. The method of claim 1, wherein data elements of the medical dataset with a data type not regulated by the security profile are at least one of not assigned to the anonymized medical dataset or not included in the anonymized medical dataset.

3. The method of claim 2, further comprising:
receiving a request for transmission of the medical dataset from the internal data memory to the external data memory; and
selecting the medical dataset belonging to the request, wherein the providing the medical dataset provides the selected medical dataset.

4. The method of claim 3, further comprising:
monitoring, at an internal data memory side, data transmission between the internal data memory and the external data memory, wherein a transmission of at least one of non-anonymized medical datasets or of medical datasets not requested is suppressed.

5. The method of claim 4, wherein
the security profile forms a standard security profile,
the standard security profile includes a rule of an anonymization of direct identifiers in data elements, and
the creating includes anonymizing the anonymized medical dataset the data elements with data types belonging to the standard security profile by anonymization of direct identifiers.

6. The method of claim 4, wherein
the security profile forms a medium security profile,
the medium security profile includes a rule of an anonymization of indirect identifiers in the data elements, and
the creating includes anonymizing the anonymized medical dataset the data elements with data types belonging to the medium security profile by anonymization of indirect identifiers.

7. The method of claim 4, wherein
the security profile comprises a high security profile,
the high security profile includes a rule of an anonymization of statistical identifiers in data elements, and
the creating includes anonymizing the anonymized medical dataset the data elements with data types belonging to the high security profile by anonymization of statistical identifiers.

8. The method of claim 4, wherein the providing the medical dataset provides a Fast Healthcare Interoperability Resources (FHIR) file as the medical dataset.

9. The method of claim 1, further comprising:
receiving a request for transmission of the medical dataset from the internal data memory to the external data memory; and
selecting the medical dataset belonging to the request, wherein the providing the medical dataset provides the selected medical dataset.

10. The method of claim 1, further comprising:
monitoring, at an internal data memory side, data transmission between the internal data memory and the external data memory, wherein a transmission of at least one of non-anonymized medical datasets or of medical datasets not requested is suppressed.

11. The method of claim 1, wherein
the security profile forms a standard security profile,
the standard security profile includes a rule of an anonymization of direct identifiers in data elements, and
the creating includes anonymizing the anonymized medical dataset the data elements with data types belonging to the standard security profile by anonymization of direct identifiers.

12. The method of claim 1, wherein
the security profile forms a medium security profile,
the medium security profile includes a rule of an anonymization of indirect identifiers in the data elements, and
the creating includes anonymizing the anonymized medical dataset the data elements with data types belonging to the medium security profile by anonymization of indirect identifiers.

13. The method of claim 1, wherein
the security profile comprises a high security profile,
the high security profile includes a rule of an anonymization of statistical identifiers in data elements, and
the creating includes anonymizing the anonymized medical dataset the data elements with data types belonging to the high security profile by anonymization of statistical identifiers.

14. The method of claim 1, wherein the providing the medical dataset provides an Fast Healthcare Interoperability Resources (FHIR) file as the medical dataset.

15. An apparatus for transmission of medical datasets, comprising:
an internal data memory; and
an external data memory, wherein the internal data memory is configured to,
provide a medical dataset and a security profile,
create an anonymized medical dataset based on the security profile and the provided medical dataset, the anonymized medical dataset is created by anonymizing data elements of the medical dataset based on an associated data type for each data element and the security profile,
provide reference data by the internal data memory, the reference data describing a relationship between at least two medical datasets,
provide a reference security profile from a plurality of reference security profiles,
create transmission reference data based on the reference data and the reference security profile, the reference data is anonymized for the transmission reference data if a highest security profile is provided as the reference security profile and the reference data remains unanonymized in the transmission reference data if the reference security profile deviates from the highest security profile, and
transmit the anonymized medical dataset and the transmission reference data to the external data memory.

16. A non-transitory computer-readable memory medium including instructions, when executed by a computer of an apparatus for transmission of medical datasets, cause the apparatus to perform the method of claim 1.

17. The non-transitory computer-readable memory medium of claim 16, wherein data elements of the medical dataset with a data type not regulated by the security profile are at least one of not assigned to the anonymized medical dataset or not included in the anonymized medical dataset.

* * * * *